United States Patent [19]

Fürstenwerth

[11] 4,432,897
[45] Feb. 21, 1984

[54] CATIONIC THIADIAZOLYL TRIAZENE DYESTUFFS

[75] Inventor: Hauke Fürstenwerth, Cologne, Fed. Rep. of Germany

[73] Assignee: Bayer Aktiengesellschaft, Leverkusen, Fed. Rep. of Germany

[21] Appl. No.: 321,823

[22] Filed: Nov. 16, 1981

[30] Foreign Application Priority Data

Dec. 5, 1980 [DE] Fed. Rep. of Germany ....... 3045912

[51] Int. Cl.³ .................... C07C 107/00; C09B 56/20; D06P 1/42; D06P 3/18
[52] U.S. Cl. .................................. 260/140; 548/128; 548/130
[58] Field of Search ................. 260/140, 141 H, 158

[56] References Cited

U.S. PATENT DOCUMENTS 3,055,881  9/1962  Voltz et al. .................... 260/140

FOREIGN PATENT DOCUMENTS 1252826  of 0000  Fed. Rep. of Germany ...... 260/158
366612   of 0000  Switzerland .................. 260/140
463654   of 0000  Switzerland .................. 260/158
2017134A of 0000  United Kingdom ............. 260/158

*Primary Examiner*—Floyd D. Higel
*Attorney, Agent, or Firm*—Sprung, Horn, Kramer & Woods

[57] ABSTRACT

The cationic triazene dyestuffs of the general formula

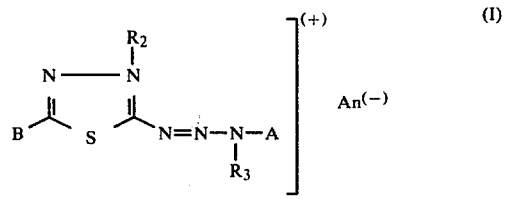

wherein
B denotes alkylmercapto, arylmercapto or a radical of the formula

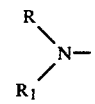

R denotes hydrogen or an alkyl, alkenyl, acyl, cycloalkyl, aryl, aralkyl, amino, alkylamino, dialkylamino, arylamino, aralkylamino or heterocyclic radical and
$R_1$ denotes hydrogen or an alkyl, alkenyl or aralkyl radical, or
R and $R_1$ are bonded to a heterocyclic structure,
$R_2$ and $R_3$ denote an alkyl, alkenyl, alkinyl or aralkyl radical, or one of the radicals $R_2$ or $R_3$ also denotes hydrogen, or
$R_3$ is bonded to the o-position of A,
A denotes an aryl radical and
$An^{(-)}$ denotes an anion, and wherein the cyclic and acyclic radicals can contain non-ionic substituents and/or a carboxyl group, can be used for dyeing and printing natural and synthetic materials.

3 Claims, No Drawings

CATIONIC THIADIAZOLYL TRIAZENE DYESTUFFS

The present invention relates to cationic triazene dyestuffs of the general formula

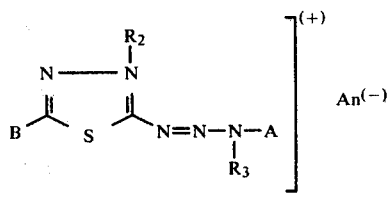

wherein

B denotes alkylmercapto, arylmercapto or a radical of the formula

R denotes hydrogen or an alkyl, alkenyl, acyl, cycloalkyl, aryl, aralkyl, amino, alkylamino, dialkylamino, arylamino, aralkylamino or heterocyclic radical and $R_1$ denotes hydrogen or an alkyl, alkenyl or aralkyl radical, or R and $R_1$ are bonded to a heterocyclic structure, $R_2$ and $R_3$ denote an alkyl, alkenyl, alkinyl or aralkyl radical, or one of the radicals $R_2$ or $R_3$ also denotes hydrogen, or $R_3$ is bonded to the o-position of A, A denotes an aryl radical and $An^{(-)}$ denotes an anion, and wherein the cyclic and acyclic radicals can contain non-ionic substituents and/or a carboxyl group.

The invention also relates to the preparation of the dyestuffs I and their use for dyeing and printing natural and synthetic materials.

Non-ionic substituents in the context of the present invention are the non-dissociating substituents customary in dyestuff chemistry, such as, for example, cyano, hydroxyl, halogen, such as fluorine, chlorine or bromine, nitro, alkyl, monoalkylamino, dialkylamino, phenyl, alkoxy, acyloxy, alkoxycarbonyl or alkoxycarbonyloxy, alkyl and alkoxy preferably containing 1-4 C atoms and acyl particularly representing $C_1$-$C_4$-alkylcarbonyl.

Within the scope of this invention, alkyl radicals are, for example, those having 1-8, particularly 1-4 C atoms.

Substituents of the alkyl radicals R-$R_3$ are, for example, halogen, hydroxyl, $C_1$-$C_4$-alkoxy, phenoxy, benzyloxy, $C_1$-$C_4$-alkoxycarbonyl, carboxyl, amidocarbonyl or cyano. Halogen preferably represents fluorine, chlorine and bromine. Alkenyl and alkinyl radicals are understood as meaning, in particular, those having 2-5 C atoms.

Cycloalkyl represents, for example, optionally $C_1$-$C_4$-alkyl-substituted cyclopentyl or cyclohexyl. Suitable acyl radicals are, for example, $C_1$-$C_4$-alkylcarbonyl, benzoyl which is optionally substituted by halogen or $C_1$-$C_4$-alkyl, $C_1$-$C_4$-alkoxycarbonyl, mono-$C_1$-$C_4$-alkylaminocarbonyl, di-$C_1$-$C_4$-alkylaminocarbonyl, benzylaminocarbonyl, $C_1$-$C_4$-alkylsulphonyl, phenylsulphonyl or di-$C_1$-$C_4$-alkylaminosulphonyl.

In general, aryl is understood as meaning phenyl and aralkyl is understood as meaning benzyl and β-phenyl-$C_1$-$C_4$-alkyl. In addition to representing phenyl, A can also represent naphthyl, for example. The phenyl rings and naphthyl rings can be substituted, for example, by 1-3 non-ionic radicals, such as halogen, $C_1$-$C_4$-alkyl, $C_1$-$C_4$-alkoxy, $C_1$-$C_4$-alkoxycarbonyl, carboxyl, amidocarbonyl, cyano, nitro, amidosulphonyl, $C_1$-$C_3$-alkylcarbonylamino, benzoylamino, hetaryl or arylazo. Hetaryl is understood as meaning, for example, optionally $C_1$-$C_4$-alkyl-substituted or $C_1$-$C_4$-alkoxy-substituted benzthiazolyl or 1,2,4-oxidazolyl.

The radicals R/$R_1$, together with the nitrogen atom to which they are bonded, can preferably form a 5-membered or 6-membered ring, such as pyrrolidine, piperidine, morpholine, piperazine, N-methyl-piperazine or N-hydroxyethyl-piperazine.

If $R_3$ is bonded to the o-position of A, it forms, for example, together with the nitrogen atom and A, a dihydroindole-, tetrahydroquinoline-, tetrahydroquinoxaline- or tetrahydro-1,4-benzoxazine ring which is optionally substituted by 1-4 $C_1$-$C_4$-alkyl or $C_1$-$C_4$-alkoxy.

The organic and inorganic anions which are customary for cationic dyestuffs are suitable anionic radicals.

Colourless anions are preferred.

The anion is determined, in general, by the preparation process and any purification of the crude dyestuff which may be carried out. In general, the dyestuffs are present as halides (particularly as chlorides or bromides) or as methosulphates, ethosulphates, sulphates, benzenesulphonates, toluenesulphonates or acetates. The anions can be replaced, in a known manner, by other anions.

Preferred dyestuffs have the general formula

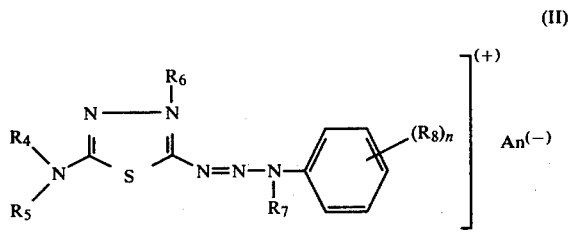

wherein $R_4$ denotes hydrogen, a $C_1$-$C_8$-alkyl radical which is optionally substituted by hydroxyl, halogen, cyano, $C_1$-$C_4$-alkoxy, carboxyl, aminocarbonyl or $C_1$-$C_4$-alkoxycarbonyl, a $C_2$-$C_4$-alkenyl radical, a cyclohexyl radical which is optionally substituted by $C_1$-$C_4$-alkyl, a phenyl, benzyl or phenylethyl radical which is optionally substituted by halogen, $C_1$-$C_4$-alkyl or $C_1$-$C_4$-alkoxy, a $C_1$-$C_4$-alkyloxycarbonyl radical, a mono-$C_1$-$C_4$-alkylaminocarbonyl radical, a di-$C_1$-$C_4$-alkylaminocarbonyl radical, an aminocarbonyl radical, a mono-$C_1$-$C_4$-alkylaminosulphonyl radical, a di-$C_1$-$C_4$-alkylaminosulphonyl radical, an amino radical, a $C_1$-$C_4$-alkylamino radical, a di-($C_1$-$C_4$-alkyl)-amino radical, or a phenylamino or benzylamino radical which is optionally substituted by $C_1$-$C_4$-alkyl or $C_1$-$C_4$-alkoxy, $R_5$ denotes hydrogen, a $C_1$-$C_8$-alkyl radical which is optionally substituted by hydroxyl, halogen, cyano, $C_1$-$C_4$-alkoxy, carboxyl, aminocarbonyl or $C_1$-$C_4$-alkoxycarbonyl, a $C_2$-$C_4$-alkenyl radical or a benzyl or phenylethyl radical which is optionally substituted by halogen, $C_1$-$C_4$-alkyl or $C_1$-$C_4$-alkoxy, $R_6$ and $R_7$ denote a $C_1$-$C_8$-alkyl radical which is optionally substituted by hydroxyl, halogen, cyano, $C_1$-$C_4$-alkoxy, carboxyl, aminocarbonyl or $C_1$-$C_4$-alkoxycarbonyl, a $C_2$-$C_4$-alkenyl radical or a benzyl or phenylethyl radical which is optionally substituted by halogen, $C_1$-$C_4$-alkyl or $C_1$-$C_4$-alkoxy, or one of the radicals $R_6$ or $R_7$ also denotes hydrogen, $R_8$ denotes hydrogen, $C_1$-$C_4$-alkyl, $C_1$-$C_4$-alkoxy, halogen, nitro, cyano, $C_1$-$C_4$-alkylsulphonyl, phenylsulphonyl, acetylamino, phenylazo, benzthiazolyl or 1,2,4-oxdiazolyl, it being possible for the stated cyclic radicals to be substituted by $C_1$-$C_4$-alkyl or phenyl, $R_7$ can be bonded to the o-position of the benzene ring and then, together with the benzene ring and the nitrogen atom, forms a dihydroindole-, tetrahydroquinoline-, tetrahydroquinoxaline- or tetrahydro-1,4-benzoxazine ring which is optionally substituted by $C_1$-$C_4$-alkyl or $C_1$-$C_4$-alkoxy, n denotes 0–3 and $An^{(-)}$ denotes an anion.

Particularly preferred dyestuffs have the formula

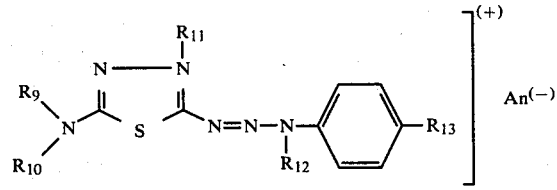

(III)

wherein $R_9$ denotes H, —$CH_3$, —$C_2H_5$, —$C_3H_7$, iso—$C_3H_7$, —$C_4H_9$, iso—$C_4H_9$, sec.—$C_4H_9$, tert.—$C_4H_9$,

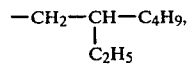

—$C_2H_4OH$, —$CH_2$—$CHOH$—$CH_3$, —$C_2H_4CN$, —$C_6H_{11}$, —$C_5H_9$, —$CH_2$—$C_6H_5$, —$C_6H_5$, —$C_6H_4Cl$ (p), —$C_6H_3Cl_2$ (2,5), —$C_6H_4$—$CH_3$ (o, m, p), —$C_6H_4$—$OCH_3$ (p), —$C_2H_4$—$O$—$CH_3$, —$C_2H_4$—$O$—$C_2H_5$ or

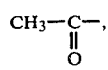

$R_{10}$ denotes H, —$CH_3$, —$C_2H_5$, —$C_3H_7$, iso—$C_3H_7$, —$C_4H_9$, iso—$C_4H_9$, sec.—$C_4H_9$, tert.—$C_4H_9$,

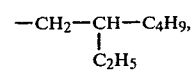

—$C_2H_4OH$, —$CH_2$—$CHOH$—$CH_3$, —$C_2H_4CN$, —$C_6H_{11}$, —$C_5H_9$, —$CH_2$—$C_6H_5$, —$C_2H_4$—$O$—$CH_3$ or —$C_2H_4$—$O$—$C_2H_5$, $R_{11}$ and $R_{12}$ denote alkyl having 1–4 C atoms, 2-cyanoethyl, 2-carbamoylethyl, 2-hydroxyethyl or benzyl, $R_{13}$ denotes H, methyl, ethyl, methoxy, ethoxy, fluorine, chlorine, bromine, methylsulphonyl, cyano, nitro, 6-methylbenzthiazol-2-yl, acetylamino or phenylazo, and $An^{(-)}$ denotes an anion.

The dyestuffs of the formula I can be prepared by the processes customary for triazene dyestuffs, which processes are described, for example, in DAS (German Published Specification) No. 1,252,826. If the diazonium salt of a 2-amino-1,3,4-thiadiazole of the formula

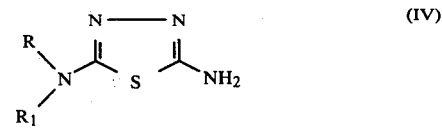

(IV)

is coupled with an aromatic amine of the formula

(V)

and the resulting triazene is reacted with a quaternising agent of the general formula $R_2$—X (VI)

the claimed dyestuffs are obtained.

The dyestuffs of the formula I can also be prepared by the coupling of diazotised aromatic amines of the formula

A—$NH_2$ (VII)

to quaternary salts of the formula

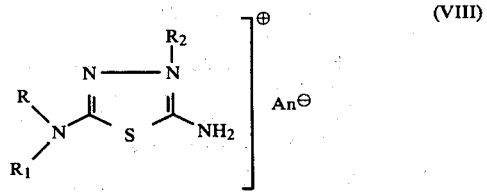

(VIII)

or to imino compounds of the formula

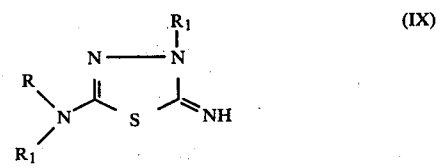

(IX)

and subsequent reaction with quaternising agents of the formula $R_3$—X (X).

A further possible synthesis comprises the reaction of triazenes of the formula

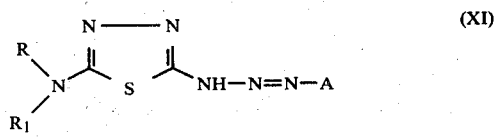

(XI)

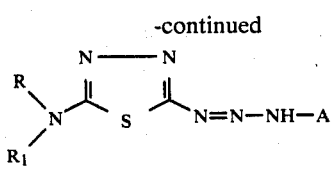

with compounds of the formulae VI and X, the radicals R-R₃ and A having, in the formulae IV-XII, the meaning given in formula I and X denoting a group which can be split off as an anion.

The dyestuffs obtained according to the process are outstandingly suitable for dyeing and printing cationically dyeable fibres composed of polymers and copolymers of acrylonitrile and dicyanoethylene, as well as acid-modified fibres composed of polyamide and polyester, fast shades being obtained. The dyestuffs can also be used for dyeing and printing cellulose materials, for example paper, and silk and leather. They are also suitable for the preparation of writing fluids, rubber-stamp goods and pastes for ball-point pens, and can also be used in offset printing.

Flocks, fibres, filaments, slivers, woven fabrics or knitted fabrics composed of polyacrylonitrile or copolymers, containing at least an 85% acrylonitrile proportion, of acrylonitrile with other vinyl compounds, such as vinyl chloride, vinylidene chloride, vinyl fluoride, vinyl acetate, vinylpyridine, vinylimidazole, vinyl alcohol, acrylates, methacrylates, acrylamides, methacrylamides and asymmetric dicyanoethylene, are particularly suitable materials for dyeing with the basic dyestuffs of the general formula (I). Flocks, fibres, filaments, slivers, woven fabrics or knitted fabrics composed of acid-modified synthetic materials, particularly of acid-modified aromatic polyesters, and acid-modified polyamide fibres, can also be outstandingly dyed. Acid-modified aromatic polyesters are, for example, polycondensation products of sulphoterephthalic acid and ethylene glycol, that is to say, polyethylene glycol terephthalates, containing sulphonic acid groups, as described in Belgian Patent Specification No. 549,179 and U.S. Patent No. 2,893,816.

The dyeing can be effected from a slightly acid liquor, the material advantageously being introduced into the dyebath at 40° to 60° C. and then being dyed at the boiling point. Dyeing can also be carried out under pressure, at temperatures above 100° C. Furthermore, the dyestuffs can be added as spinning solutions for the preparation of fibres containing polyacrylonitrile, or can also be applied to the unstretched fibre.

The dyeings of the dyestuffs, according to the invention, of the formula I on materials composed of polyacrylonitrile or acid-modified polyester fibres or polyamide fibres are distinguished by very good fastness to light, fastness to wet processing, fastness to rubbing and fastness to sublimation, and by a high affinity to the fibre.

Some of them are also distinguished by good migrating power and a low sensitivity to thiocyanate.

The dyestuffs can be used individually or in mixtures. They are very suitable, in chlorohydrocarbons, as a dyebath for dyeing mouldings composed of polymers or copolymers of acrylonitrile, asymmetric dicyanoethylene, acid-modified aromatic polyesters or acid-modified synthetic superpolyamides, if they carry substituents, such as, for example, the tert.-butyl group, which promote the solubility in chlorohydrocarbons, or if the anion $An^{(-)}$ in the formula (I) is the anion of a monobasic organic acid having 4-30 carbon atoms.

In the examples which follow, parts denote parts by weight.

EXAMPLE 1

A diazonium salt solution prepared in the customary manner from 9.3 parts of aniline and sodium nitrite is allowed to flow into a solution, containing hydrochloric acid, of 2-imino-3-methyl-5-dimethylamino-2,3-dihydro-1,3,4-thiadiazole at 0°–5°. The reaction mixture is adjusted to a pH of 7–8 by the dropwise addition of sodium hydroxide solution. The mixture is further stirred for one hour, and the precipitate is filtered off under suction, washed and dried. 25 parts of a yellow triazene dyestuff of the formula

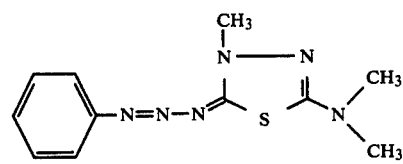

are thus obtained.

25 parts of the resulting yellow triazine compound are dissolved in 400 parts of chlorobenzene, and 13 parts of dimethyl sulphate are added to the solution at 70° C., whilst stirring. The mixture is stirred for 2 hours at 70°, cooled to 20° and worked up in the customary manner. After the product has been dried, 29 parts of a yellow dyestuff of the formula

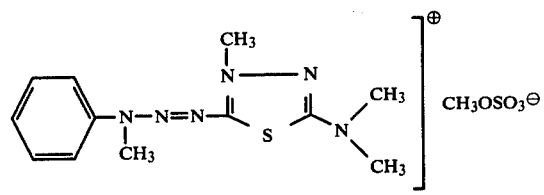

are obtained, which dyestuff dyes textile materials composed of polyacrylonitrile, as well as other textile materials which can be dyed with cationic dyestuffs, yellow with outstanding lightfastness and fastness to wet processing, with excellent affinity and high intensity, as well as good migrating power.

If the procedure described in Example 1 is followed and the thiadiazole derivatives and aniline derivatives listed in Table 1 are used, analogous dyestuffs are obtained after reaction with dimethyl sulphate, which dyestuffs dye polyacrylonitrile, with similar fastness properties, in the shades indicated.

TABLE 1

| Example | Thiadiazole derivative | Aniline derivative | Shade |
|---|---|---|---|
| 2 | ![structure: (CH₃)₂N-C(=N-N(CH₃)-C(=NH))-S] thiadiazole with two CH₃ on one N and CH₃ on another N | H₂N—C₆H₄—OCH₃ | yellow |
| 3 | " | H₂N—C₆H₄—CN | yellow |
| 4 | " | H₂N—C₆H₄—Cl | yellow |
| 5 | " | H₂N—C₆H₄—NO₂ | golden yellow |
| 6 | " | H₂N—C₆H₄—F | yellow |
| 7 | " | H₂N—C₆H₄—N=N—C₆H₅ | yellow-orange |
| 8 | " | H₂N—C₆H₄—C(=N—)—S— (benzothiazole with 2,4-CH₃) | yellow |
| 9 | thiadiazole with two isopropyl N and one CH₃ N | H₂N—C₆H₄—NO₂ | golden yellow |
| 10 | " | H₂N—C₆H₄—Cl | yellow |
| 11 | " | H₂N—C₆H₄—S(=O)(=O)—CH₃ | yellow |
| 12 | " | H₂N—C₆H₄—CH₃ | yellow |
| 13 | thiadiazole with phenyl-NH and CH₃-N | H₂N—C₆H₄—NO₂ | golden yellow |

TABLE 1-continued

| Example | Thiadiazole derivative | Aniline derivative | Shade |
|---|---|---|---|
| 14 | " | H₂N—C₆H₄—N=C(S)—C₆H₃—CH₃ | yellow |
| 15 | 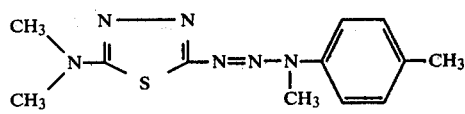 | H₂N—C₆H₄—N=N—C₆H₅ | orange |
| 16 | " | H₂N—C₆H₄—Cl | yellow |

EXAMPLE 17

14.5 parts of 2-amino-5-dimethylamino-1,3,4-thiadiazole, in a mixture composed of 10 parts of ice, 10 parts of acetic acid and 20 parts of sulphuric acid, are diazotised with 7 parts of sodium nitrite, dissolved in 20 parts of sulphuric acid, at 0°–5°. The solution of the diazonium salt is added to a solution, containing hydrochloric acid, of 13 parts of N-methyl-p-toluidine. The pH value of the mixture is adjusted to 4–5 using sodium hydroxide solution. The mixture is further stirred, the precipitate which has separated out is isolated, and, after the product has been dried, 26 parts of a triazene of the formula $$\text{(CH}_3\text{)}_2\text{N–C(=N–N)–S–C(=N–N=N–N(CH}_3\text{)–C}_6\text{H}_4\text{–CH}_3\text{)}$$

are obtained.

26 parts of this triazene are dissolved in 300 parts of chlorobenzene, and 14 parts of dimethyl sulphate are added to the solution at 79°, whilst stirring. The mixture is further stirred for 1 hour at 70° and is cooled to 20°, and, after the customary working-up, 32 parts of a yellow dyestuff of the formula $$[\text{(CH}_3\text{)}_2\text{N–C(=N–N(CH}_3\text{))–S–C(=N–N=N–N(CH}_3\text{)–C}_6\text{H}_4\text{–CH}_3\text{)}]^{\oplus}\ \text{CH}_3\text{OSO}_3^{\ominus}$$

are obtained, which dyestuff dyes acrylic fabrics yellow, with outstanding fastness properties.

If the procedure described in Example 17 is followed and the thiadiazole derivatives and aniline derivatives listed in Table 2 are used, analogous dyestuffs are obtained after reaction with dimethyl sulphate, which dyestuffs dye polyacrylonitrile, with similar fastness properties, in the shades indicated.

TABLE 2

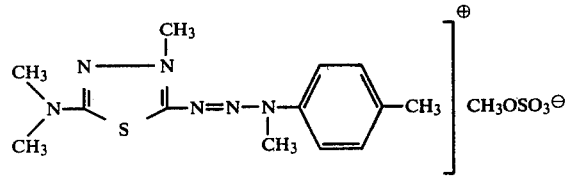

| Example | Thiadiazole derivative | Aniline derivative | Shade |
|---|---|---|---|
| 18 | (H₅C₂)₂N—C(N—N)S—C—NH₂ | HN(CH₃)—C₆H₄—NO₂ | golden yellow |
| 19 | " | HN(C₂H₅)—C₆H₄—CH₃ | yellow |
| 20 | " | HN(CH₃)—C₆H₄—Cl | yellow |
| 21 | morpholino—C(N—N)S—C—NH₂ | HN(CH₃)—C₆H₄—CN | yellow |
| 22 | " | HN(C₂H₄OH)—C₆H₄—Cl | yellow |
| 23 | " | HN(CH₃)—C₆H₄—NO₂ | golden yellow |
| 24 | CH₃—NH—C(N—N)S—C—NH₂ | HN(CH₃)—C₆H₄—CH₃ | yellow |
| 25 | " | HN(CH₃)—C₆H₄—CN | yellow |

TABLE 2-continued

| Example | Thiadiazole derivative | Aniline derivative | Shade |
|---|---|---|---|
| 26 | " | HN(CH₃)—C₆H₄—NO₂ | yellow |
| 27 | " | HN(CH₃)—C₆H₄—Cl | yellow |
| 28 | H₂N—[1,3,4-thiadiazole]—NH₂ | HN(CH₃)—C₆H₄—CN | yellow |
| 29 | " | HN(CH₃)—C₆H₄—NH₂ | yellow |
| 30 | " | HN(C₂H₅)—C₆H₄—CH₃ | yellow |
| 31 | " | HN(CH₃)—C₆H₄—Cl | yellow |

EXAMPLE 32

14 parts of 2-amino-5-dimethyl-amino-1,3,4-thiadiazole are introduced into a diazonium salt solution prepared from 9.3 parts of aniline, at 0°–5°. The pH value of the mixture is adjusted to 8 by the addition of sodium hydroxide solution. The product is isolated and washed with water, and the residues are stirred in 200 parts of water. After 40 parts of dimethyl sulphate and 4 parts of magnesium oxide have been added, the mixture is further stirred for 6 hours at 20°. The mixture is then stirred for 2 hours at 70°, the dyestuff solution is clarified and the triazene dyestuff is salted out by the addition of sodium chloride and zinc chloride. After the customary working-up and drying, 20 parts of a triazene dyestuff of the formula

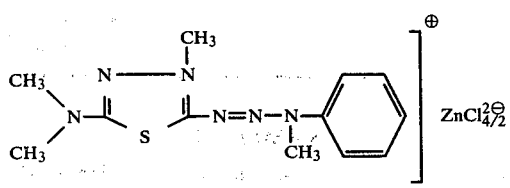

are obtained, which dyestuff dyes polyacrylonitrile, with fastness properties which are identical to those of the dyestuff described in Example 1.

If the procedure described in Example 32 is followed and the thiadiazole derivatives and aniline derivatives listed in Table 3 are used, analogous dyestuffs are obtained, which dye polyacrylonitrile, with similar fastness properties, in the shades indicated.

TABLE 3

| Example | Thiadiazole derivative | Aniline derivative | Shade |
|---|---|---|---|
| 33 | C₆H₅—CH₂—N(CH₃)—[1,3,4-thiadiazole]—NH₂ | H₂N—C₆H₄—NO₂ | golden yellow |
| 34 | " | H₂N—C₆H₄—[benzothiazole]—CH₃ | yellow |
| 35 | cyclohexyl-N(CH₃)—[1,3,4-thiadiazole]—NH₂ | H₂N—C₆H₄—SO₂—CH₃ | yellow |
| 36 | " | H₂N—C₆H₄—Cl | yellow |
| 37 | (HOH₄C₂)₂N—[1,3,4-thiadiazole]—NH₂ | H₂N—C₆H₄—N=N—C₆H₄—CH₃ | yellow-orange |
| 38 | " | " | yellow-orange |

TABLE 3-continued

| Example | Thiadiazole derivative | Aniline derivative | Shade |
|---|---|---|---|
| 39 | piperidine-N-C(=N-N=)-S-C(-NH₂) thiadiazole | H₂N-C₆H₄-CN | yellow |
| 40 | " | H₂N-C₆H₅ | yellow |
| 41 | (H₉C₄)₂N-C(=N-N=)-S-C(-NH₂) thiadiazole | H₂N-C₆H₄-Cl | yellow |
| 42 | " | H₂N-C₆H₄-NO₂ | yellow |
| 43 | H₅C₂-S-C(=N-N=)-S-C(-NH₂) thiadiazole | H₂N-C₆H₄-NO₂ | yellow |
| 44 | cyclohexyl-S-C(=N-N=)-S-C(-NH₂) thiadiazole | H₂N-C₆H₄-NO₂ | yellow |

I claim:

1. A cationic triazene dyestuff of the formula

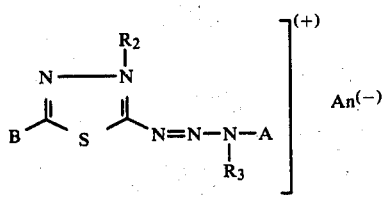

wherein

B is alkylmercapto, arylmercapto or

R is hydrogen, alkyl, alkenyl, $C_1$-$C_4$-alkylcarbonyl, benzoyl, benzoyl substituted by halogen or $C_1$-$C_4$-alkyl, $C_1$-$C_4$-alkoxycarbonyl, mono-$C_1$-$C_4$-alkylaminocarbonyl, di-$C_1$-$C_4$-alkylaminocarbonyl, benzylaminocarbonyl, $C_1$-$C_4$-alkylsulphonyl, phenylsulphonyl, di-$C_1$-$C_4$-alkylaminosulphonyl, cycloalkyl, aryl, aralkyl, amino, alkylamino, dialkylamino, arylamino or aralkylamino, $R_1$ is hydrogen, alkyl, alkenyl or aralkyl, or R and $R_1$ together with the nitrogen atom to which they are bonded are pyrrolidine, piperidine, morpholine, piperazine, N-methyl-piperazine or N-hydroxyethylpiperazine, $R_2$ and $R_3$ each independently is alkyl, alkenyl, alkynyl or aralkyl, or one of them is hydrogen, or $R_3$ is bonded to the o-position of A, and together with the nitrogen atom and A is dihydroindole, tetrahydro-1,4-benzoxazine which is unsubstituted or substituted by 1-4 $C_1$-$C_4$-alkyl or $C_1$-$C_4$-alkoxy, A is aryl, and An$^{(-)}$ is an anion, or a substitution product thereof wherein the cyclic and acyclic radicals are substituted by cyano, hydroxyl, halogen, nitro, alkyl, monoalkylamino, dialkylamino, phenyl, alkoxy, alkoxycarbonyl, alkoxcarbonyloxy, $C_1$-$C_4$-alkyl-carbonyloxy or carboxyl; or R-$R_3$ is substituted by phenoxy, benzyloxy or amidocarbonyl.

2. A dyestuff according to claim 1 of the formula

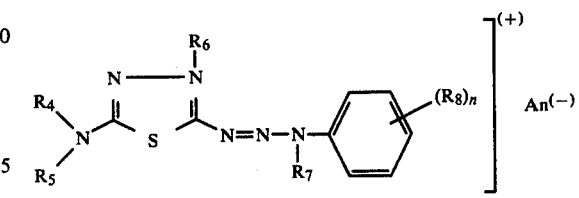

wherein $R_4$ is hydrogen; $C_1$-$C_8$-alkyl; $C_1$-$C_8$-alkyl substituted by hydroxyl, halogen, cyano, $C_1$-$C_4$-alkoxy, carboxyl, aminocarbonyl or $C_1$-$C_4$-alkoxycarbonyl; $C_2$-$C_4$-alkenyl; cyclohexyl; cyclohexyl substituted by $C_1$-$C_4$-alkyl; phenyl; benzyl; phenylethyl; phenyl, benzyl or phenethyl substituted by halogen, $C_1$-$C_4$-alkyl or $C_1$-$C_4$-alkoxy; $C_1$-$C_4$-alkyloxycarbonyl; mono-$C_1$-$C_4$-alkylaminocarbonyl; di-$C_1$-$C_4$-alkylaminocarbonyl; aminocarbonyl; mono-$C_1$-$C_4$-alkylaminosulphonyl; di-$C_1$-$C_4$- alkylaminosulphonyl; amino; $C_1$-$C_4$-alkylamino; di-($C_1$-$C_4$-alkyl)-amino; phenylamino; benzylamino; or phenylamino or benzylamino substituted by $C_1$-$C_4$-alkyl or $C_1$-$C_4$-alkoxy, $R_5$ is hydrogen; $C_1$-$C_8$-alkyl; $C_1$-$C_8$-alkyl substituted by hydroxyl, halogen, cyano, $C_1$-$C_4$-alkoxy, carboxyl, aminocarbonyl or $C_1$-$C_4$-alkoxycarbonyl; $C_2$-$C_4$-alkenyl; benzyl; phenethyl; or benzyl or phenylethyl substituted by halogen, $C_1$-$C_4$-alkyl or $C_1$-$C_4$-alkoxy;

$R_6$ and $R_7$ each independently is $C_1$-$C_8$-alkyl; $C_1$-$C_8$-alkyl substituted by hydroxyl, halogen, cyano $C_1$-$C_4$-alkoxy, carboxyl, aminocarbonyl or $C_1$-$C_4$-alkoxycarbonyl; $C_2$-$C_4$-alkenyl; benzyl; phenethyl; benzyl or phenylethyl radical substituted by halogen, $C_1$-$C_4$-alkyl or $C_1$-$C_4$-alkoxy; or one of the radicals $R_6$ or $R_7$ is hydrogen, $R_8$ is hydrogen; $C_1$-$C_4$-alkyl; $C_1$-$C_4$-alkoxy; halogen; nitro; cyano; $C_1$-$C_4$-alkylsulphonyl; phenylsulphonyl; acetylamino; phenylazo; benzthiazolyl; 1,2,4-oxdiazolyl; or phenylsulphonyl, phenylazo, benzthiazolyl or 1,2,4-oxdiazolyl substituted by $C_1$-$C_4$-alkyl or phenyl, or $R_7$ is bonded to the o-position of the benzene ring and then, together with the benzene ring and the nitrogen atom, forms a dihydroindole-, tetrahydroquinoline-, tetrahydroquinoxaline- or tetrahydro-1,4-benzoxazine ring which is unsubstituted or substituted by $C_1$-$C_4$-alkyl or $C_1$-$C_4$-alkoxy, and n is 0–3.

3. A dyestuff according to claim 1 of the formula

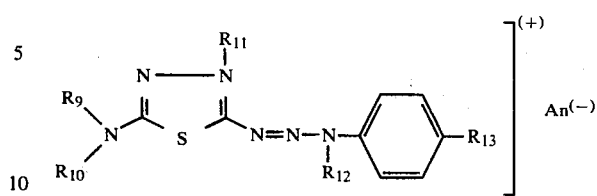

wherein
$R_9$ denotes H, —$CH_3$, —$C_2H_5$, —$C_3H_7$, iso—$C_3H_7$, —$C_4H_9$, iso—$C_4H_9$, sec.—$C_4H_9$, tert.—$C_4H_9$,

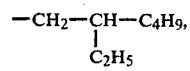

—$C_2H_4OH$, —$CH_2$—CHOH—$CH_3$, —$C_2H_4CN$, —$C_6H_{11}$, —$C_5H_9$, —$CH_2$—$C_6H_5$, —$C_6H_5$, —$C_6H_4Cl$ (p), —$C_6H_3Cl_2$ (2,5), —$C_6H_4$—$CH_3$ (o, m, p), —$C_6H_4$—$OCH_3$ (p), —$C_2H_4$—O—$CH_3$, —$C_2H_4$—O—$C_2H_5$ or

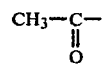

$R_{10}$ denotes H, —$CH_3$, —$C_2H_5$, —$C_3H_7$, iso—$C_3H_7$, —$C_4H_9$, iso—$C_4H_9$, sec.—$C_4H_9$, tert.—$C_4H_9$,

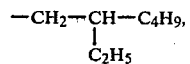

—$C_2H_4OH$, —$CH_2CHOH$—$CH_3$, —$C_2H_4CN$, —$C_6H_{11}$, —$C_5H_9$, —$CH_2$—$C_6H_5$, —$C_2H_4$—O—$CH_3$ or —$C_2H_4$—O—$C_2H_5$, $R_{11}$ and $R_{12}$ denote alkyl having 1–4 C atoms, 2-cyanoethyl, 2-carbamoylethyl, 2-hydroxyethyl or benzyl, and $R_{13}$ denotes H, methyl, ethyl, methoxy, ethoxy, fluorine, chlorine, bromine, methylsulphonyl, cyano, nitro, 6-methylbenzthiazol-2-yl, acetylamino or phenylazo.

* * * * *